US012190907B2

(12) United States Patent
Jang et al.

(10) Patent No.: US 12,190,907 B2
(45) Date of Patent: Jan. 7, 2025

(54) METHOD AND SYSTEM FOR AUTOMATIC BACK-CHANNEL GENERATION IN INTERACTIVE AGENT SYSTEM

(71) Applicant: Korea Electronics Technology Institute, Seongnam-si (KR)

(72) Inventors: Jin Yea Jang, Suwon-si (KR); Sa Im Shin, Seoul (KR); Min Young Jung, Hwaseong-si (KR); San Kim, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 251 days.

(21) Appl. No.: 17/894,061

(22) Filed: Aug. 23, 2022

(65) Prior Publication Data
US 2023/0069655 A1 Mar. 2, 2023

(30) Foreign Application Priority Data
Aug. 30, 2021 (KR) .......................... 10-2021-0114490

(51) Int. Cl.
*G10L 25/63* (2013.01)
*G10L 15/22* (2006.01)
*G10L 25/39* (2013.01)

(52) U.S. Cl.
CPC .............. *G10L 25/63* (2013.01); *G10L 15/22* (2013.01); *G10L 25/39* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 2020/0365146 A1* | 11/2020 | Adiba | ..................... | G10L 25/78 |
| 2021/0104236 A1* | 4/2021 | Doggett | .................. | G10L 15/22 |
| 2022/0067300 A1* | 3/2022 | Sugiyama | ............. | G10L 13/027 |
| 2022/0115001 A1* | 4/2022 | Bratt | ....................... | G10L 15/22 |

FOREIGN PATENT DOCUMENTS

| | | |
|---|---|---|
| JP | 2018-124425 A | 8/2018 |
| KR | 10-1891489 B1 | 8/2018 |
| KR | 10-2019-0127708 A | 11/2019 |

OTHER PUBLICATIONS

Korean Office Action issued on Jul. 23, 2024, in counterpart Korean Patent Application No. 10-2021-0114490 (5 pages in English, 7 pages in Korean).

* cited by examiner

*Primary Examiner* — Stella L. Woo
(74) *Attorney, Agent, or Firm* — NSIP Law

(57) ABSTRACT

There are provided a method and a system for automatically generating a back-channel in an interactive agent system. According to an embodiment of the disclosure, an automatic back-channel generation method includes: predicting a back-channel by analyzing an utterance of a user inputted in a back-channel prediction model; and generating the predicted back-channel, and the back-channel prediction model is an AI model that is trained to predict a back-channel to express from the utterance of the user. Accordingly, a back-channel is automatically generated by utilizing a back-channel prediction module which is based on a language model, so that a natural dialogue interaction with a user may be implemented in an interactive agent system, and quality of a dialogue service provided to a user may be enhanced.

17 Claims, 4 Drawing Sheets

METHOD AND SYSTEM FOR AUTOMATIC BACK-CHANNEL GENERATION IN INTERACTIVE AGENT SYSTEM

CROSS-REFERENCE TO RELATED APPLICATION(S) AND CLAIM OF PRIORITY

This application is based on and claims priority under 35 U.S.C. § 119 to Korean Patent Application No. 10-2021-0114490, filed on Aug. 30, 2021, in the Korean Intellectual Property Office, the disclosure of which is herein incorporated by reference in its entirety.

BACKGROUND

Field

The disclosure relates to artificial intelligence (AI) utilization technology, and more particularly, to a method which automatically generates and expresses a back-channel while a user is speaking, in order to implement a natural interaction in a system that automatically generates a dialogue response and exchanges an utterance with a user.

Description of Related Art

A current dialogue system may be implemented in a turn taking method whereby a user and the dialogue system exchange an utterance in turn.

However, during a real dialogue between persons, a listener may send a backchannel signal in order to express that he/she concentrates on speaker's utterance, understands what the speaker is saying, or feels sympathy, while the speaker is saying.

There is an attempt to generate a back-channel, but this attempt is a rule-based approach and has a problem that adaptability to a real dialogue environment is degraded. In addition, back-channel signals may fall into various categories in terms of functions, but this is not considered and there may be a problem that only a specific back-channel signal is generated.

SUMMARY

The disclosure has been developed to address the above-discussed deficiencies of the prior art, and an object of the present disclosure is to provide a method and a system for automatically generating a back-channel, as a solution to implement a natural dialogue interaction with a user in an interactive agent system and to enhance quality of a dialogue service provided to a user.

According to an embodiment of the disclosure to achieve the above-described object, an automatic back-channel generation method may include: receiving an utterance of a user; predicting a back-channel by analyzing the received utterance of the user in a back-channel prediction model; generating the predicted back-channel; and outputting the generated back-channel, and the back-channel prediction model may be an AI model that is trained to predict a back-channel to express from the utterance of the user.

The back-channel prediction model may predict whether a back-channel will be generated from the utterance of the user.

The back-channel prediction model may predict a category of a back-channel from the utterance of the user.

The category of the back-channel may include at least one of a back-channel which expresses 'continual,' a back-channel which expresses 'understanding,' a back-channel which expresses 'agreement,' a back-channel which expresses 'emotional response,' a back-channel which expresses 'empathetic response'.

According to an embodiment of the disclosure, the automatic back-channel generation method may further include: extracting an utterance voice feature from an utterance voice of the user; converting the utterance voice of the user into an utterance text; and extracting an utterance text feature from the converted utterance text, and predicting may include receiving the extracted utterance voice feature and utterance text feature at the back-channel prediction model, analyzing, and predicting the back-channel.

According to an embodiment of the disclosure, the automatic back-channel generation method may further include extracting an utterance sentiment feature from the utterance text, and predicting may include further receiving the extracted sentiment feature at the back-channel prediction model, analyzing, and predicting the back-channel.

The utterance sentiment feature may be sentiment distribution information indicating a number of sentiment dictionary words existing in the utterance text.

The back-channel prediction model may be trained to receive the utterance voice feature and the utterance text feature and to predict the back-channel, and may be trained to receive the utterance text feature and to predict an utterance sentiment feature.

Training to predict the back-channel may be performed at the same as training to predict the utterance sentiment feature.

According to another embodiment of the disclosure, an automatic back-channel generation system may include: an input unit configured to receive an utterance of a user; a prediction unit configured to predict a back-channel by analyzing the received utterance of the user in a back-channel prediction model; a generator configured to generate the predicted back-channel; and an output unit configured to output the generated back-channel, and the back-channel prediction model may be an AI model that is trained to predict a back-channel to express from the utterance of the user.

According to another embodiment of the disclosure, an automatic back-channel generation method may include: predicting a back-channel by analyzing an utterance of a user in a back-channel prediction model; and generating the predicted back-channel, and the back-channel prediction model may be an AI model that is trained to predict a back-channel to express from the utterance of the user.

According to another embodiment of the disclosure, an automatic back-channel generation system may include: a prediction unit configured to predict a back-channel by analyzing an utterance of a user in a back-channel prediction model; and a generator configured to generate the predicted back-channel, and the back-channel prediction model may be an AI model that is trained to predict a back-channel to express from the utterance of the user.

According to embodiments of the disclosure as described above, a back-channel is automatically generated by utilizing a back-channel prediction module which is based on a language model, so that a natural dialogue interaction with a user may be implemented in an interactive agent system, and quality of a dialogue service provided to a user may be enhanced.

In addition, according to embodiments of the disclosure, a rich dialogue interaction may be implemented by predicting various functional back-channel categories, and a back-channel suitable to an utterance context may be generated by applying a sentiment feature.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in detail with reference to the accompanying drawings.

Embodiments of the disclosure propose a method and a system for automatic back-channel generation in an interactive agent system. The back-channel refers to an audio signal of a short and quick response that is given to a speaker by a listener when the speaker is saying in a dialogue, such as "well", "yes, yes."

According to embodiments of the disclosure, in a system which automatically generates a dialogue response and exchanges an utterance with a user, a back-channel may be automatically generated and expressed in order to implement a natural interaction while a user is speaking.

Specifically, in an embodiment of the disclosure, a back-channel may be predicted based on a language model which learns linguistic knowledge from a large-capacity corpus, not based on a rule, and a natural dialogue interaction may be implemented.

In addition, an embodiment of the disclosure proposes a model that exactly predicts a time to generate a back-channel, based on a user utterance, and appropriately predicts a back-channel category.

In addition, in an embodiment of the disclosure, performance of a back-channel prediction model may be reinforced by utilizing a sentiment feature directly/indirectly from an utterance text.

Figure 1:
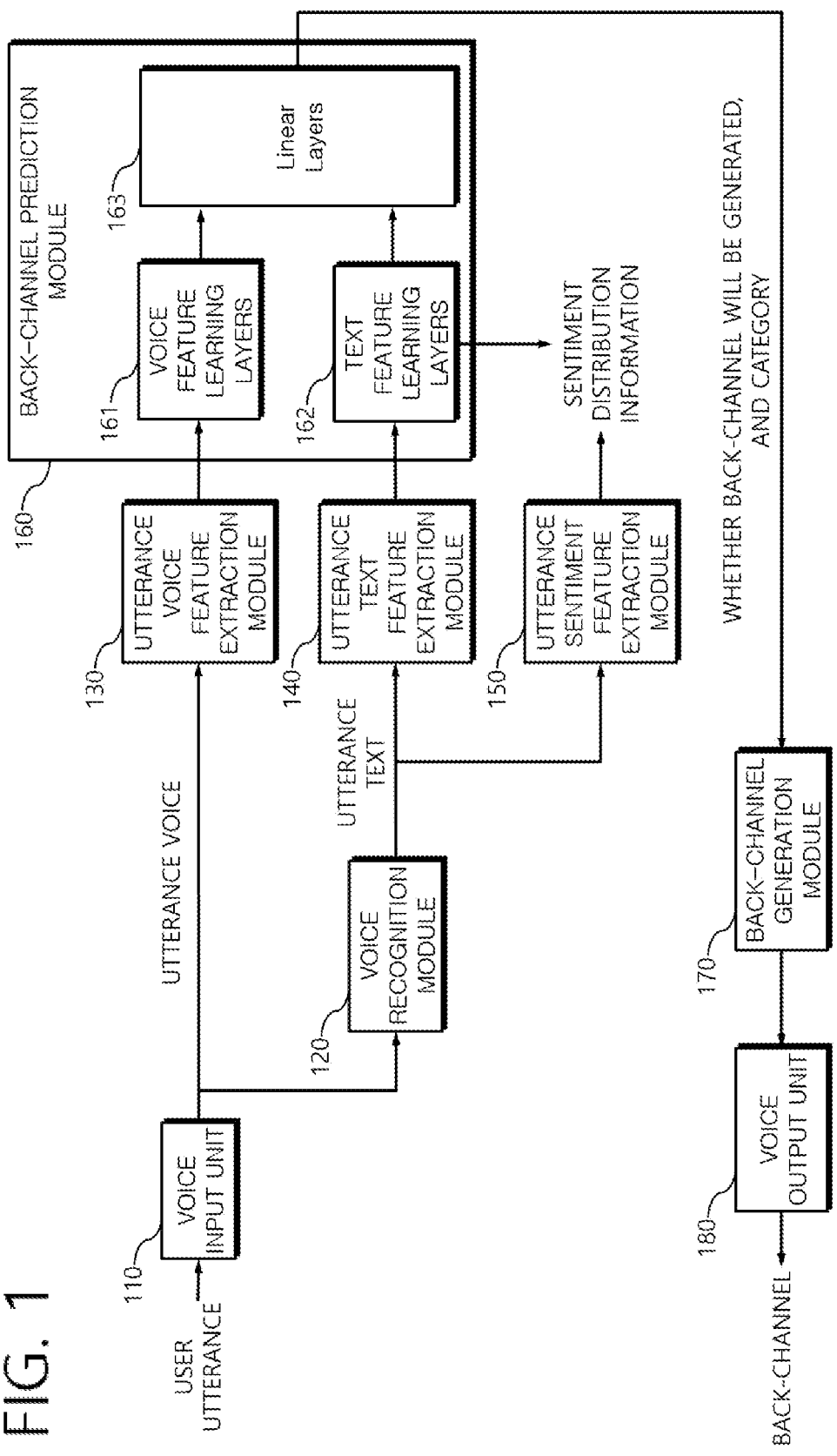
FIG. 1 is a view illustrating a configuration of an automatic back-channel generation system according to an embodiment of the disclosure.

FIG. 1 is a view illustrating a configuration of an automatic back-channel generation system according to an embodiment of the disclosure.

As shown in the drawing, the automatic back-channel generation system according to an embodiment may be established by including a voice input unit 110, a voice recognition module 120, an utterance voice feature extraction module 130, an utterance text feature extraction module 140, an utterance sentiment feature extraction module 150, a back-channel prediction module 160, a back-channel generation module 170, and a voice output unit 180.

The voice input unit 110 may be a means for receiving an utterance of a user, and may transmit an utterance voice of the user which is inputted to the voice recognition module 120 and the utterance voice feature extraction module 130.

The utterance voice feature extraction module 130 may extract an utterance voice feature from the user's utterance voice which is inputted through the voice input unit 110. The voice recognition module 120 may be a speech-to-text (STT) conversion module to convert the user's utterance voice, which is inputted through the voice input unit 110, into an utterance text. The utterance text feature extraction module 140 may extract an utterance text feature from the utterance text converted at the voice recognition module 120.

The utterance sentiment feature extraction module 150 may extract an utterance sentiment feature from the utterance text converted at the voice recognition module 120. Specifically, the utterance sentiment feature extraction module 150 may extract sentiment distribution information by counting the number of sentiment dictionary words existing in the utterance text.

The back-channel prediction module 160 may predict a back-channel to express by using a back-channel prediction model.

The back-channel prediction model may be an AI model that is trained to receive the utterance voice feature extracted at the utterance voice feature extraction module 130, and the utterance text feature extracted at the utterance text feature extraction module 140, to analyzes the same, and to predict a back-channel.

By the back-channel prediction model, it may be predicted whether a back-channel will be expressed based on the user's utterance, that is, whether a back-channel will be generated at a present time, and a category (type) of the back-channel to be generated may be predicted.

The category of the back-channel may include a back-channel which expresses 'continual', a back-channel which expresses 'understanding,' a back-channel which expresses 'agreement,' a back-channel which expresses 'emotional response,' a back-channel which expresses 'empathic response.'

As shown in FIG. 1, the back-channel prediction model performing such functions may separately process user's utterance input by using layers 161 for learning the utterance voice feature and layers 162 for learning the utterance text feature. Hidden representations generated on the layers 161, 162 may be combined and inputted to and processed at linear layers 163. An output from the linear layers 163 may be a prediction value indicating whether a back-channel will be generated and a category.

Accordingly, by the back-channel prediction model, it may be predicted whether a back-channel will be expressed from the user's utterance, that is, whether a back-channel will be generated at the present time, and a category (type) of the back-channel to be generated may be predicted.

In addition, the text feature learning layers 162 of the back-channel prediction model may be trained to receive the utterance text feature extracted at the utterance text feature extraction module 140, to analyze, and to predict sentiment distribution information.

To achieve this, the back-channel prediction model may be implemented by a deep learning-based model, and may utilize a multi-tasking learning method when learning. That is, at a step of learning by the back-channel prediction model, a main-task of predicting whether a back-channel will be generated and a category of the back-channel, and a sub-task of predicting a distribution of utterance sentiment features may be performed simultaneously, and learning by the back-channel prediction model may proceed.

The main task may be inputting the utterance voice feature and the utterance text feature to the back-channel prediction model, and training the back-channel prediction model so as to reduce a loss between a predicted back-channel value and a ground truth (GT) value.

The sub-task may be inputting the utterance text feature to the text feature learning layers 162 of the back-channel prediction model, and training the back-channel prediction model so as to reduce a loss between predicted sentiment distribution information and sentiment distribution information which is extracted by the utterance sentiment feature extraction module 150.

Accordingly, parameters of a language model which becomes a backbone of the text feature learning layers 162 may be fine-tuned by learning by both the two tasks simultaneously, so that an ability to utilize knowledge on utterance sentiment information may be enhanced in prediction of a back-channel.

A total learning loss ($L_T$) of the back-channel prediction model may include $L_M$ which is a main task loss and $L_S$ which is a sub task loss, thereby being expressed by $L_T = \alpha L_M + (1-\alpha)L_S$. A ratio of two losses may be adjusted through a value of $\alpha$ and features of training data may be reflected.

The back-channel generation module 170 may generate a back-channel signal which is predicted by the back-channel prediction module 160. The back-channel generation module 170 may generate a back-channel signal of a category that is predicted by the back-channel prediction module 160 at a time of generation of the back-channel that is predicted by the back-channel prediction module 160.

The voice output unit 180 may output the back-channel signal which is generated by the back-channel generation module 170 as a voice signal.

Figure 2:
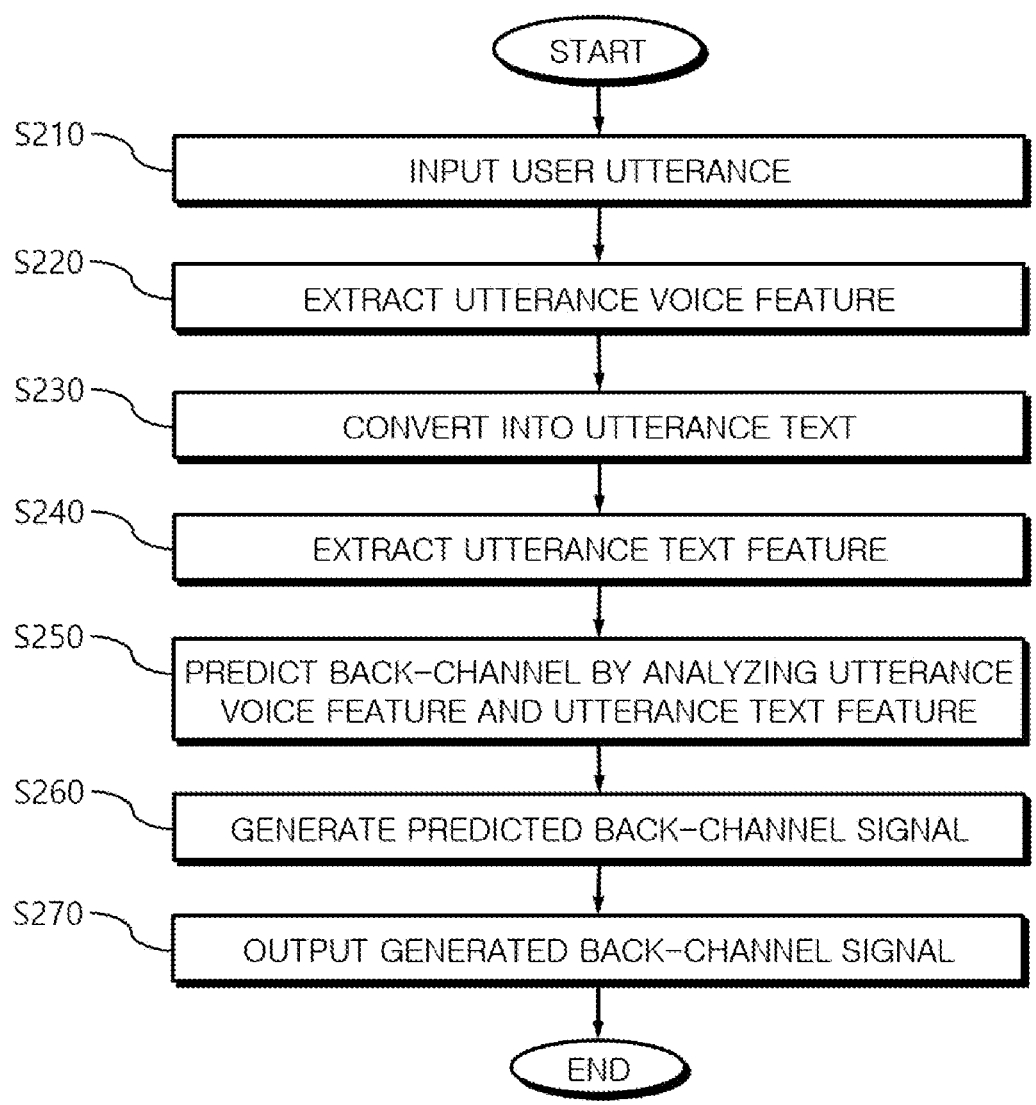
FIG. 2 is a flowchart provided to explain an automatic back-channel generation method according to another embodiment of the disclosure.

FIG. 2 is a flowchart provided to explain an automatic back-channel generation method according to another embodiment of the disclosure.

When the voice input unit 110 receives an utterance of a user (S210), the utterance voice feature extraction module 130 may extract an utterance voice feature from an utterance voice of the user, which is inputted through step S210, in order to automatically generate a back-channel (S220).

The voice recognition module 120 may convert the utterance voice of the user, which is inputted through step S210, into an utterance text (S230), and the utterance text feature extraction module 140 may extract an utterance text feature from the utterance text converted at step S230 (S240).

Next, the back-channel prediction module 160 may receive the utterance voice feature which is extracted at step S220, and the utterance text feature which is extracted at step S240, may analyze the same, and may predict a back-channel (S250).

Then, the back-channel generation module 170 may generate a back-channel signal which is predicted at step S250 (S260), and the voice output unit 180 may output the back-channel signal which is generated at step S260 as a voice signal (S270).

Figure 3:
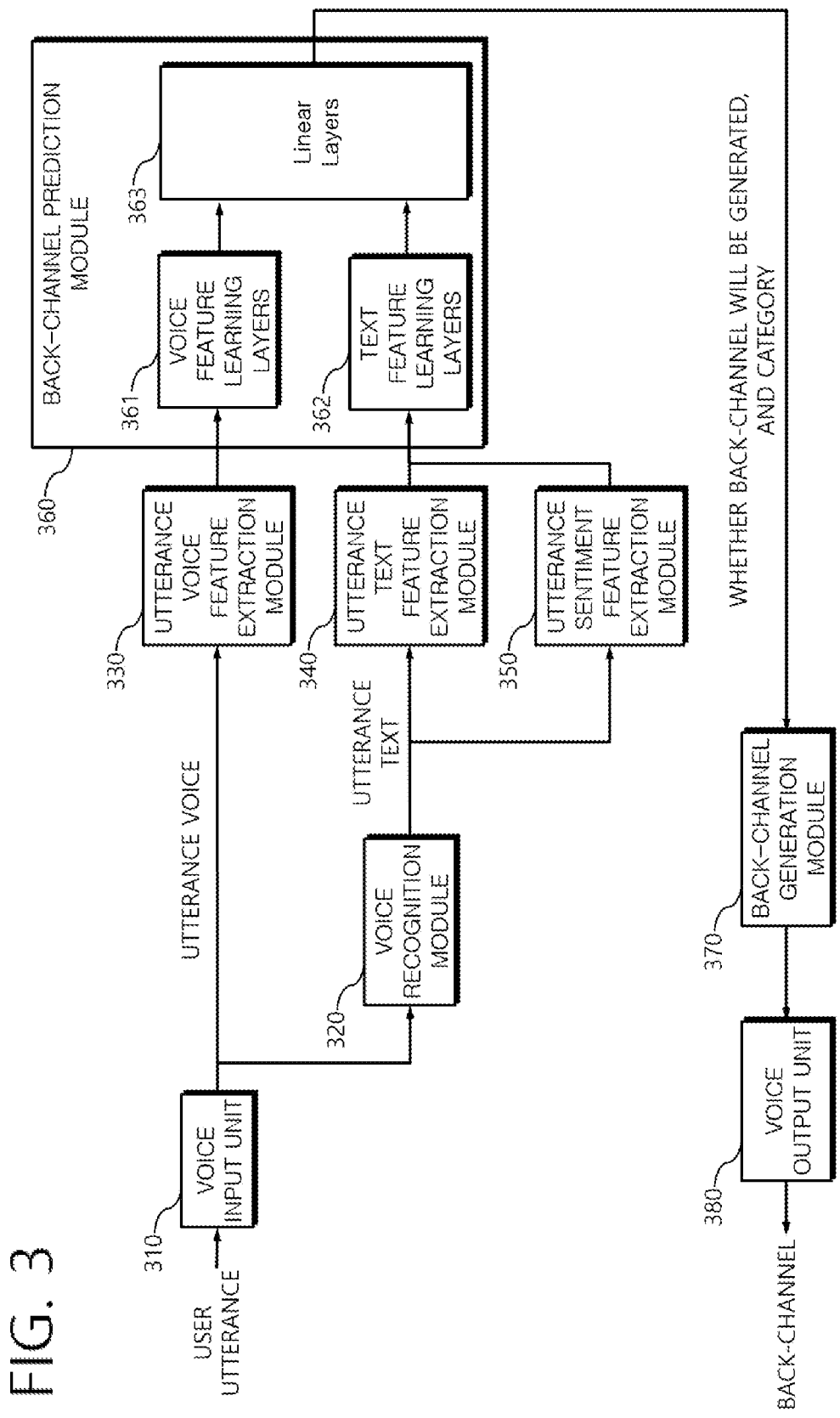
FIG. 3 is a view illustrating a configuration of an automatic back-channel generation system according to another embodiment of the disclosure.

Hereinafter, another implementation method of an automatic back-channel generation system will be described in detail with reference to FIG. 3. FIG. 3 is a view illustrating a configuration of an automatic back-channel generation system according to another embodiment of the disclosure.

As shown in the drawing, the automatic back-channel generation system according to an embodiment may be established by including a voice input unit 310, a voice recognition module 320, an utterance voice feature extraction module 330, an utterance text feature extraction module 340, an utterance sentiment feature extraction module 350, a back-channel prediction module 360, a back-channel generation module 370, and a voice output unit 380.

The voice input unit 310, the voice recognition module 320, the utterance voice feature extraction module 330, the utterance text feature extraction module 340, and the utterance sentiment feature extraction module 350 may be the same as the voice input unit 110, the voice recognition module 120, the utterance voice feature extraction module 130, the utterance text feature extraction module 140, and the utterance sentiment feature extraction module 150 shown in FIG. 1 in terms of functions, and thus a detailed description thereof is omitted.

The back-channel prediction module 360 may predict a back-channel to express by using a back-channel prediction model.

The back-channel prediction model may be an AI model that is trained to receive the utterance voice feature extracted at the utterance voice feature extraction module 330, the utterance text feature extracted at the utterance text feature extraction module 340, and the utterance sentiment feature extracted by the utterance sentiment feature extraction module 350, to analyzes the same, and to predict a back-channel.

By the back-channel prediction model, it may be predicted whether a back-channel will be expressed based on the user's utterance, that is, whether a back-channel will be generated at a present time, and a category (type) of the back-channel to be generated may be predicted.

The back-channel prediction model performing such functions may separately process user's utterance input by using layers 361 for learning the utterance voice feature and layers 362 for learning the utterance text feature and the utterance sentiment feature. Hidden representations generated on the layers 361, 362 may be combined and inputted to and processed at linear layers 363. An output from the linear layers 363 may be a prediction value indicating whether a back-channel will be generated and a category.

The back-channel prediction model may be implemented by a deep learning-based model, and the utterance voice feature, the utterance text feature, and the utterance sentiment feature may be inputted to the back-channel prediction model, and the back-channel prediction model may be trained so as to reduce a loss between a predicted back-channel value and a ground truth (GT) value.

Functions of the back-channel generation module 370 and the voice output unit 380 may be the same as the functions of the back-channel generation module 170 and the voice output unit 180 of FIG. 1, and thus a detailed description thereof is omitted.

Figure 4:
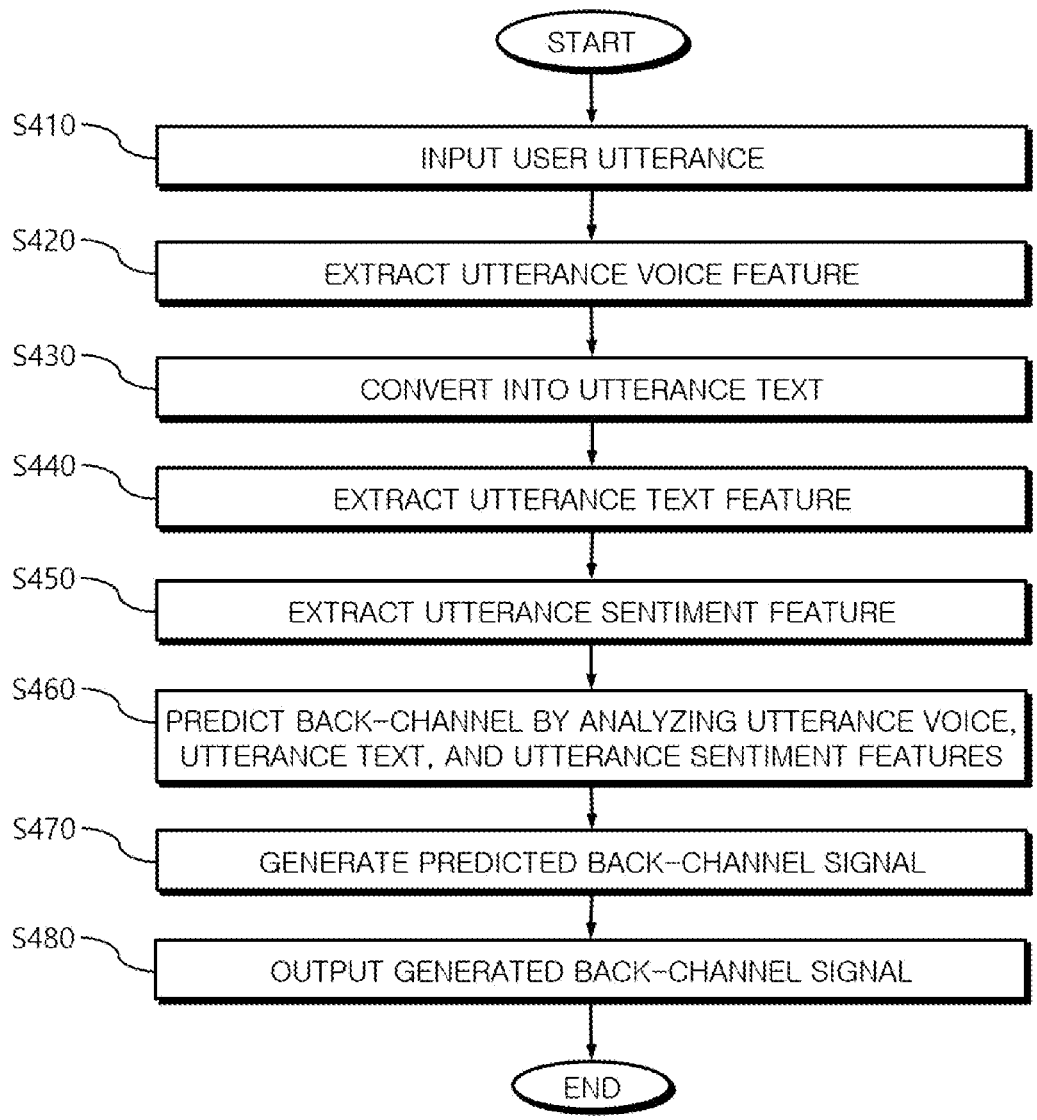
FIG. 4 is a flowchart provided to explain an automatic back-channel generation method according to still another embodiment of the disclosure.

FIG. 4 is a flowchart provided to explain an automatic back-channel generation method according to still another embodiment of the disclosure.

When the voice input unit 310 receives an utterance of a user (S410), the utterance voice feature extraction module 330 may extract an utterance voice feature from an utterance voice of the user, which is inputted through step S410, in order to automatically generate a back-channel (S420).

The voice recognition module 320 may convert the utterance voice of the user, which is inputted through step S410, into an utterance text (S430), the utterance text feature extraction module 340 may extract an utterance text feature from the utterance text converted at step S430 (S440), and the utterance sentiment feature extraction module 350 may extract an utterance sentiment feature from the utterance text converted at step S430 (S450).

Next, the back-channel prediction module 360 may receive the utterance voice feature which is extracted at step S420, the utterance text feature which is extracted at step S440, and the utterance sentiment feature which is extracted at step S450, may analyze the same, and may predict a back-channel (S460).

Then, the back-channel generation module 370 may generate a back-channel signal which is predicted at step S460 (S470), and the voice output unit 380 may output the back-channel signal which is generated at step S470 as a voice signal (S480).

Up to now, the method and the system for automatic back-channel generation in the interactive agent system have been described in detail with reference to preferred embodiments.

Embodiments of the disclosure propose an automatic back-channel generation method for implementing a natural dialogue interaction with a user in an interactive agent system and for enhancing quality of a service provided to the user.

Accordingly, a rich dialogue interaction may be implemented by predicting various functional back-channel categories, and high performance may be guaranteed by utilizing a back-channel prediction module which is based on a language model, and a back-channel suitable to an utterance context may be generated by applying a sentiment feature.

The technical concept of the disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. An automatic back-channel generation method comprising:
   receiving an utterance of a user;
   predicting a back-channel and predicting a utterance sentiment feature by analyzing the received utterance of the user in a back-channel prediction model;
   generating the predicted back-channel; and
   outputting the generated back-channel,
   wherein the back-channel prediction model is an AI model that is trained to predict a back-channel to express from the utterance of the user, and
   wherein a training of the back-channel prediction model to predict the back-channel is performed at the same as a training of the back-channel prediction model to predict the utterance sentiment feature is performed.

2. The automatic back-channel generation method of claim 1, wherein the back-channel prediction model is configured to predict whether a back-channel will be generated from the utterance of the user.

3. The automatic back-channel generation method of claim 1, wherein the back-channel prediction model is configured to predict a category of a back-channel from the utterance of the user.

4. The automatic back-channel generation method of claim 3, wherein the category of the back-channel comprises at least one of a back-channel which expresses 'continual,' a back-channel which expresses 'understanding,' a back-channel which expresses 'agreement,' a back-channel which expresses 'emotional response,' a back-channel which expresses 'empathetic response'.

5. The automatic back-channel generation method of claim 1, further comprising:
   extracting an utterance voice feature from an utterance voice of the user;
   converting the utterance voice of the user into an utterance text; and
   extracting an utterance text feature from the converted utterance text,
   wherein predicting comprises receiving the extracted utterance voice feature and utterance text feature at the back-channel prediction model, analyzing, and predicting the back-channel.

6. The automatic back-channel generation method of claim 5, further comprising extracting an utterance sentiment feature from the utterance text,
   wherein predicting comprises further receiving the extracted sentiment feature at the back-channel prediction model, analyzing, and predicting the back-channel.

7. The automatic back-channel generation method of claim 6, wherein the utterance sentiment feature is sentiment distribution information indicating a number of sentiment dictionary words existing in the utterance text.

8. The automatic back-channel generation method of claim 5, wherein the back-channel prediction model is trained to receive the utterance voice feature and the utterance text feature and to predict the back-channel, and is trained to receive the utterance text feature and to predict the utterance sentiment feature.

9. An automatic back-channel generation system comprising:

one or more processors comprising:
an input unit configured to receive an utterance of a user;
a prediction unit configured to predict a back-channel and predict a utterance sentiment feature by analyzing the received utterance of the user in a back-channel prediction model;
a generator configured to generate the predicted back-channel; and
an output unit configured to output the generated back-channel,
wherein the back-channel prediction model is an AI model that is trained to predict a back-channel to express from the utterance of the user, and
wherein a training of the back-channel prediction model to predict the back-channel is performed at the same as a training of the back-channel prediction model to predict the utterance sentiment feature is performed.

10. The system of claim 9, wherein the back-channel prediction model is configured to predict whether a back-channel will be generated from the utterance of the user.

11. The system of claim 9, wherein the back-channel prediction model is configured to predict a category of a back-channel from the utterance of the user.

12. The system of claim 11, wherein the category of the back-channel comprises at least one of a back-channel which expresses 'continual,' a back-channel which expresses 'understanding,' a back-channel which expresses 'agreement,' a back-channel which expresses 'emotional response,' a back-channel which expresses 'empathetic response'.

13. The system of claim 9, wherein the one or more processors are further configured to:
extract an utterance voice feature from an utterance voice of the user;
convert the utterance voice of the user into an utterance text; and
extract an utterance text feature from the converted utterance text,
wherein the predicting comprises receiving the extracted utterance voice feature and utterance text feature at the back-channel prediction model, analyzing, and predicting the back-channel.

14. The system of claim 13, wherein the one or more processors are further configured to extract an utterance sentiment feature from the utterance text,
wherein the predicting comprises further receiving the extracted sentiment feature at the back-channel prediction model, analyzing, and predicting the back-channel.

15. The system of claim 14, wherein the utterance sentiment feature is sentiment distribution information indicating a number of sentiment dictionary words existing in the utterance text.

16. The system of claim 13, wherein the back-channel prediction model is trained to receive the utterance voice feature and the utterance text feature and to predict the back-channel, and is trained to receive the utterance text feature and to predict the utterance sentiment feature.

17. An automatic back-channel generation method comprising:
predicting a back-channel and predicting a utterance sentiment feature by analyzing an utterance of a user in a back-channel prediction model; and
generating the predicted back-channel,
wherein the back-channel prediction model is an AI model that is trained to predict a back-channel to express from the utterance of the user, and
wherein a training of the back-channel prediction model to predict the back-channel is performed at the same as a training of the back-channel prediction model to predict the utterance sentiment feature is performed.

* * * * *